United States Patent [19]

Cataldo

[11] 4,157,107
[45] Jun. 5, 1979

[54] RUN-FLAT TIRE HAVING INTEGRAL INTERNAL SUPPORT MEANS

[75] Inventor: Roy S. Cataldo, Birmingham, Mich.

[73] Assignee: General Motors Corporation, Detroit, Mich.

[21] Appl. No.: 893,471

[22] Filed: Apr. 3, 1978

[51] Int. Cl.² .......................................... B60C 17/04
[52] U.S. Cl. ............................ 152/330 RF; 152/158; 152/362 R
[58] Field of Search .................... 152/152, 158, 330 L, 152/330 RF, 330 R, 362 R

[56] References Cited

U.S. PATENT DOCUMENTS

| | | | |
|---|---|---|---|
| 2,224,066 | 12/1940 | Shore | 152/158 |
| 2,306,432 | 12/1942 | Gandrud | 152/152 X |
| 2,981,305 | 4/1961 | Reed | 152/330 R |
| 3,610,308 | 10/1971 | McDonald | 152/330 RF |

*Primary Examiner*—Joseph F. Peters, Jr.
*Assistant Examiner*—D. W. Underwood
*Attorney, Agent, or Firm*—John P. Moran

[57] ABSTRACT

The drawings disclose a pneumatic tubeless tire including either one or two load support running bands adapted to support the weight of a vehicle should the tire become deflated. The circumferential centers of the support bands are substantially coplanar with the planes of respective annular tire beads. In one embodiment the applicable bead is a third bead integrally formed adjacent one of the normal beads on the inner surface of the beaded edge of the tire. Double rows of circumferentially oriented, spaced apart tension spokes, with alternate pairs thereof oppositely angularly disposed so as to cross one another, rigidly connect each support band to the respective annular bead. An annular ridge is formed on the rim adjacent the inner edge of each beaded end to retain the beaded ends in position during deflated tire conditions.

3 Claims, 4 Drawing Figures

U.S. Patent    Jun. 5, 1979    4,157,107
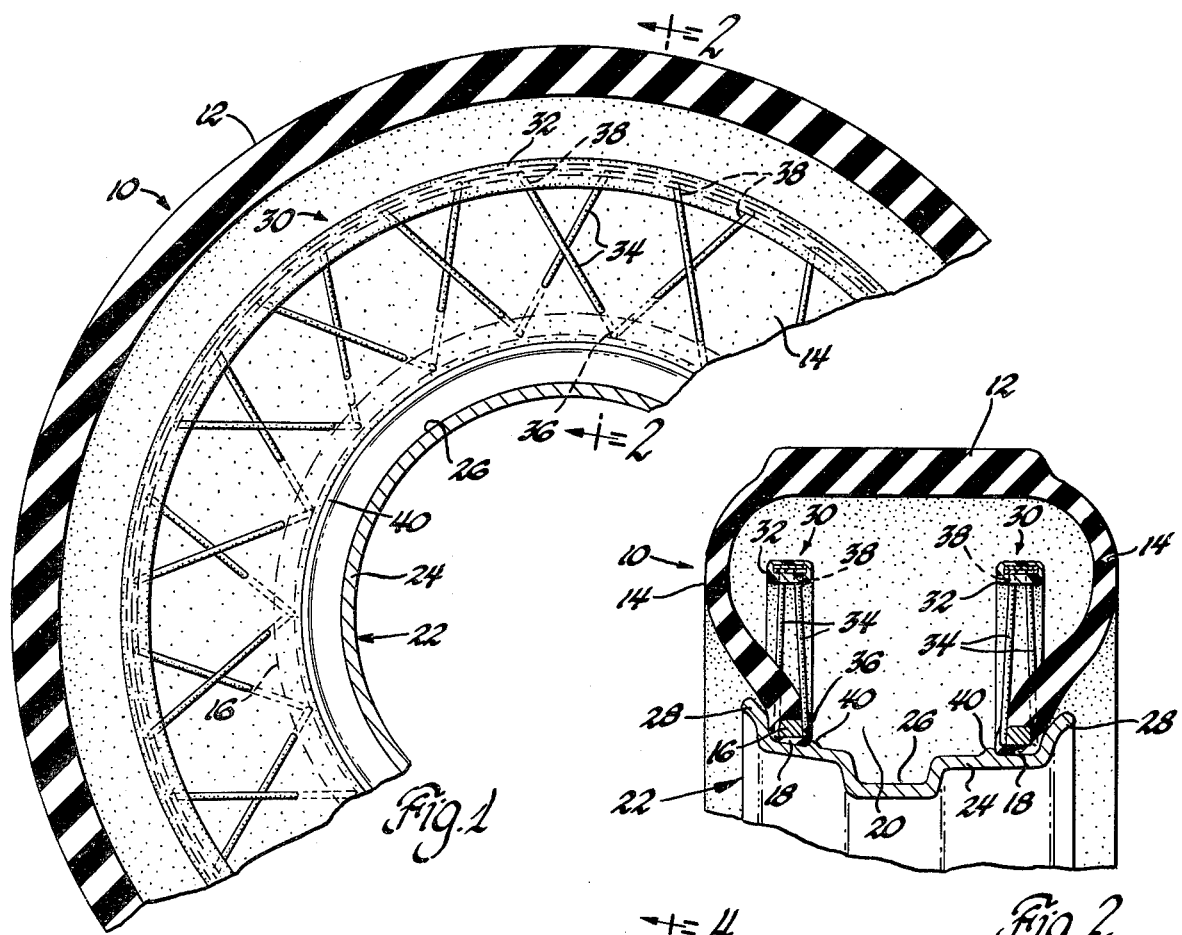
Fig.1
Fig.2
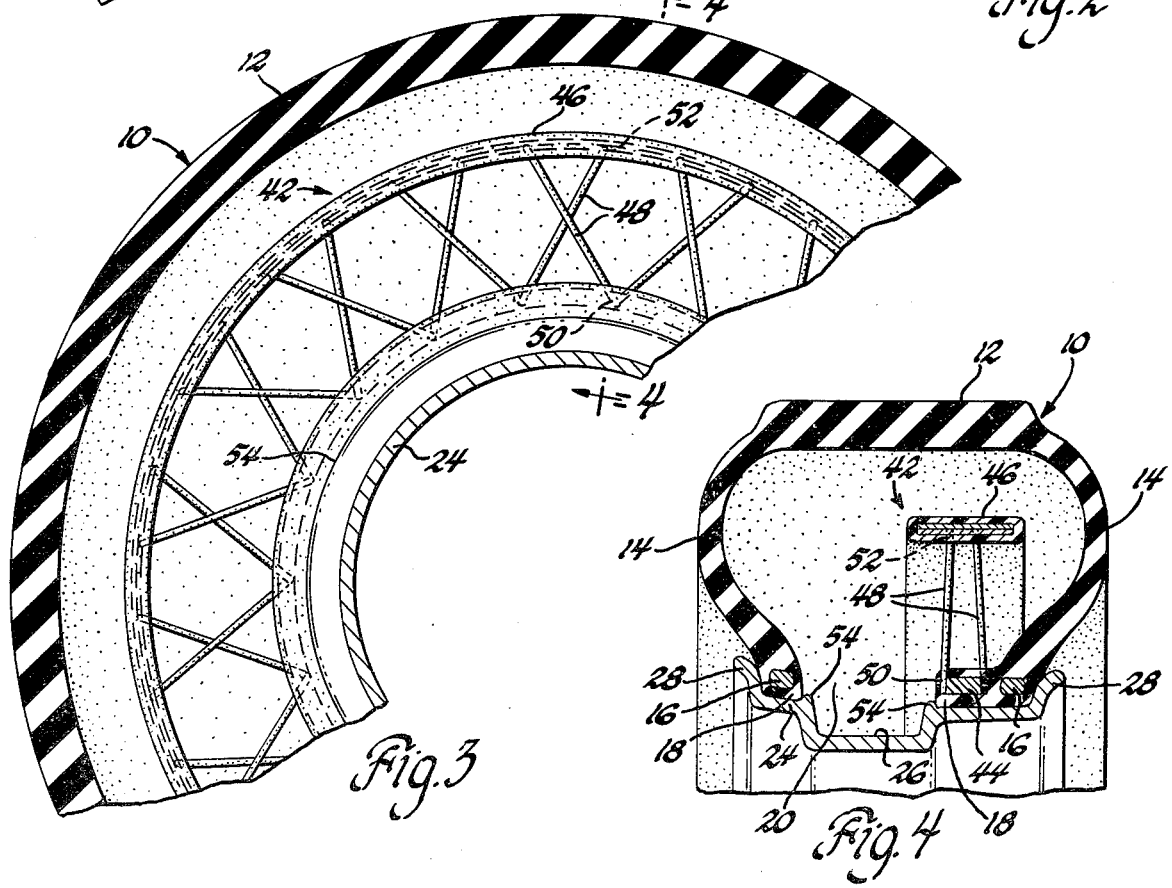
Fig.3
Fig.4

RUN-FLAT TIRE HAVING INTEGRAL INTERNAL SUPPORT MEANS

This invention relates generally to pneumatic tires and, more particularly, to pneumatic tires having internal "run-flat" features.

Heretofore, various structures have been suggested for use inside a pneumatic tire to support the weight of the vehicle in the event of a deflated tire.

The object of this invention is to provide improved internal means for use in pneumatic tires for rotatably supporting a vehicle in the event of a "flat tire" condition.

Another object of the invention is to provide improved internal "run-flat" support means wherein such means is integrally formed on the tire.

A further object of the invention is to provide, for use on a drop center wheel rim, a pneumatic tubeless tire including the usual outer tread portion, oppositely disposed sidewalls, a bead adjacent each inner sidewall end, and, in cooperation therewith, integral internal support means, including at least one load support band supported by two rows of circumferentially oriented, spaced tension spokes whose inner ends are secured to a tire bead and whose outer ends are secured to the load support band, and arranged in a criss-crossing manner, suitable for retaining the band in position to support the outer tread portion of the tire and the weight of the vehicle should the tire become deflated.

These and other objects and advantages will become more apparent when reference is made to the following description and accompanying drawings, wherein:

FIG. 1 is a fragmentary cross-sectional view of a wheel and pneumatic tire arrangement embodying the invention;

FIG. 2 is a cross-sectional view taken along the plane 2—2 of FIG. 1, and looking in the directions of the arrows;

FIG. 3 is a fragmentary cross-sectional view of a wheel and pneumatic tire arrangement showing an alternate embodiment of the invention; and FIG. 4 is a fragmentary cross-sectional view taken along the plane 4—4 of FIG. 3, and looking in the directions of the arrows.

Referring now to the drawings in greater detail, FIGS. 1 and 2 illustrate a pneumatic tubeless tire 10 including an outer tread portion 12, oppositely disposed sidewalls 14, a bead 16 adjacent each inner sidewall end portion 18, and an annular opening 20 between the beaded ends. The tire 10 is mounted on a vehicle wheel 22 having a rim 24 including a drop center 26 and rim flanges 28 formed on oppositely disposed sides thereof for retaining the beaded ends 16/18 in sealing engagement therewith when the tire is inflated.

A tire stabilizer 30 is integrally formed within the tire 10. The tire stabilizer 30 includes a pair of laterally adjacent load support rings 32, which may be steel-belted, rubber running bands, disposed within the tire 10 intermediate the oppositely disposed sidewalls 14, with the circumferential centers thereof substantially coplanar with the planes of the axes of the respective annular beads 16. Double rows of circumferentially oriented, spaced tension spokes 34 are operatively connected between each annular bead 16 and each respective load support ring 32, with each spoke of each row having the inner end 36 thereof bonded or secured in any suitable manner to one side portion of one of the beads 16 and the outer end 38 thereof bonded or otherwise secured to one of the load support rings 32. The spokes 34 may be formed of a fiberous glass reinforced material or a suitable metallic material. Alternate pairs of spokes 34 in each row are oppositely angularly disposed so as to cross one another, thereby retaining the respective load support rings in position to support the outer tread portion 12 and the weight of the vehicle should the tire become deflated. An annular ridge 40 is formed on the rim 24 adjacent the inner edge of each of the beaded ends 16/18 to retain the beaded ends in position against the respective flanges 28 during a deflated tire condition.

In the alternate embodiment shown in FIGS. 3 and 4, a tire stabilizer 42 includes a third annular bead 44 formed in the annular opening 20 adjacent and integrally connected to one of the inner sidewall ends 18. A steel-reinforced rubber load support band 46 is disposed within the tire 10 intermediate the oppositely disposed sidewalls 14, with the circumferential center thereof substantially coplanar with the axis of the third annular bead 44. Two adjacent rows of circumferentially oriented, spaced tension spokes 48 are operatively connected between the third annular bead 44 and the load support band 46, with each spoke of each row having the inner end 50 thereof bonded or secured in any suitable manner to one side portion of the third annular bead 44 and the outer end 52 thereof bonded or otherwise secured to the load support band as in the FIGS. 1 and 2 embodiment. Alternate pairs of spokes 48 in each row are oppositely angularly disposed so as to cross one another, thereby retaining the load support band 46 in position to support the outer tread portion 12 and the weight of the vehicle should the tire become deflated. Annular ridges 54 are formed on the rim 24 adjacent the respective inner edges of the third annular bead 44 and the other inner sidewall end 18 to retain both types of beaded ends in position against the respective flanges 28 during a deflated tire condition.

Assembly of the tire 10 onto the rim 24 is accomplished in the usual tire mounting manner, there being no substantial interference from the stabilizer arrangements 30 and 42. In the case of the FIGS. 3 and 4 embodiment, the drop center portion of the rim is formed wide enough to accommodate the positioning of the double beaded end therein during the tire mounting operation.

While but two embodiments of the invention have been shown and described, other modifications thereof are possible.

The embodiments of the invention in which an exclusive property or priviledge is claimed are defined as follows:

1. In combination with a pneumatic tire including an outer tread portion, oppositely disposed sidewalls, an annular bead adjacent each inner sidewall end, and an annular opening between the beaded ends, and a vehicle wheel having a rim with flanges formed on oppositely disposed sides thereof for retaining the beaded ends in sealing engagement therewith when the tire is inflated; a tire stabilizer comprising a rigid running band disposed within the tire intermediate the oppositely disposed sidewalls with the circumferential center thereof substantially coplanar with the center of one of the annular beads, two adjacent rows of circumferentially oriented, spaced tension spokes operatively connected at the inner ends thereof to one of the beaded ends and secured at the outer ends thereof to the running band with alternate spokes in each row being oppositely angularly disposed, said spokes retaining the running band in position to support the outer tread portion should the tire become deflated, and an annular ridge formed on the rim adjacent the inner edge of each of the beaded ends to retain the beaded ends in position during a deflated tire condition.

2. In combination with a pneumatic tire including an outer tread portion, oppositely disposed sidewalls, an annular bead adjacent each inner sidewall end, and an annular opening between the beaded ends, and a vehicle wheel having a rim with flanges formed on oppositely disposed sides thereof for retaining the beaded ends in sealing engagement therewith when the tire is inflated; a tire stabilizer comprising a pair of laterally adjacent load support rings disposed within the tire intermediate the oppositely disposed sidewalls with the circumferential centers thereof substantially coplanar with the respective centers of the annular beads, a double row of circumferentially oriented, spaced tension spokes operatively connected between each annular bead and each respective load support ring with each spoke of each row having the inner end thereof secured to one side portion of one of the beads and the outer end thereof secured to one of the load support rings, and alternate pair of spokes in each row being oppositely angularly disposed so as to cross one another, said spokes retaining the respective load support rings in position to support the outer tread portion should the tire become deflated, and an annular ridge formed on the rim adjacent the inner edge of each of the beaded ends to retain the beaded ends in position against the respective flanges during a deflated tire condition.

3. In combination with a pneumatic tire including an outer tread portion, oppositely disposed sidewalls, an annular bead adjacent each inner sidewall end, and an annular opening between the beaded ends, and a vehicle wheel having a rim with flanges formed on oppositely disposed sides thereof for retaining the beaded ends in sealing engagement therewith when the tire is inflated; a tire stabilizer comprising a third annular bead formed in the annular opening adjacent and integrally connected to one of the inner sidewall ends, a load support band disposed within the tire intermediate the oppositely disposed sidewalls with the circumferential center thereof substantially coplanar with the third annular bead, two adjacent rows of circumferentially oriented, spaced tension spokes operatively connected between the third annular bead and the load support band with each spoke of each row having the inner end thereof secured to one side portion of the third annular bead and the outer end thereof secured to the load support band, and alternate pairs of spokes in each row being oppositely angularly disposed so as to cross one another, said spokes retaining the load support band in position to support the outer tread portion should the tire become deflated, and annular ridges formed on the rim adjacent the respective inner edges of the third annular bead and the other inner sidewall end to retain the beaded ends in position against the respective flanges during a deflated tire condition.

* * * * *